Sept. 21, 1948.  A. L. HESTON  2,449,652

EXTRUSION PRESS

Filed Oct. 29, 1945

INVENTOR.
ALLEN L. HESTON
BY
Oberlin & Limbach
ATTORNEYS

Patented Sept. 21, 1948

2,449,652

UNITED STATES PATENT OFFICE 2,449,652

EXTRUSION PRESS

Allen L. Heston, Akron, Ohio, assignor to National Rubber Machinery Company, Akron, Ohio, a corporation of Ohio Application October 29, 1945, Serial No. 625,363

5 Claims. (Cl. 18—12)

This invention relates as indicated to extrusion presses and more particularly to the type of press in which the extrusion screw carries a point at its forward end which requires to be maintained in predetermined axial relation with respect to the orifice through which the work material is extruded.

Due to variations in the character of the material being worked upon, variations in the character of the desired product, variations in temperature, and other factors such as wear, it is frequently necessary to make adjustments of the extrusion screw with respect to the extrusion orifice. Inasmuch as the axial thrust on the extrusion screw is required to be carried by a substantially rigid axial thrust bearing, there has been considerable difficulty in providing means for the ready axial adjustment of the extrusion screw.

It is a principal object of the present invention to provide an extrusion press in which the extrusion screw may be adjusted with respect to the extrusion orifice by means which are always readily accessible, and for the operation of which means there need be no disassembly of any of the other parts of the machine.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
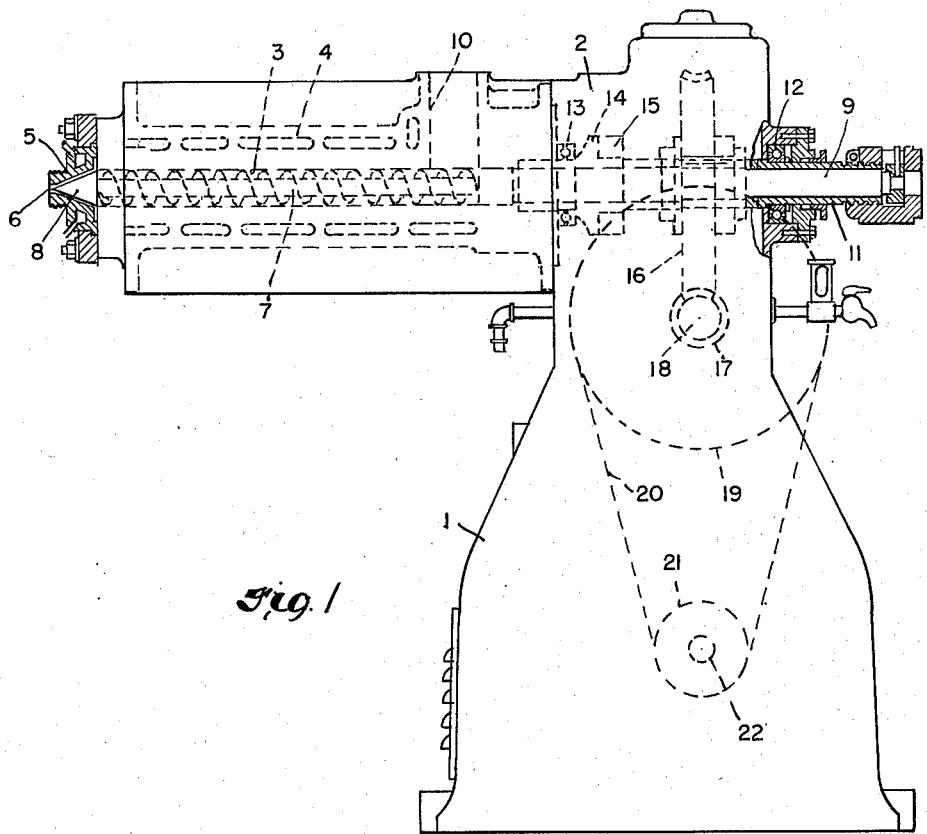
Fig. 1 is a side elevation partially in section of an extrusion press incorporating the principles of my invention.

Referring now more specifically to the drawing and more especially to Fig. 1, the machine here illustrated comprises a base or body portion generally indicated at 1 on which is supported a head generally indicated at 2 which houses the extrusion mechanism. The head 2 is provided in a lateral extension thereof with an extrusion chamber 3 which is provided with a cored jacket 4 through which may be circulated a temperature modifying medium for the purpose of providing the proper temperature to the work material which is caused to move through the chamber 3. Positioned at the end of the extrusion head is a die member 5 provided with an extrusion orifice 6 preferably in axial alignment with the chamber 3.

Rotatably supported in the head 2 in a manner hereinafter more particularly explained is an extrusion screw assembly with which my invention is particularly concerned. The screw assembly comprises an extrusion screw having a forwardly extending screw part 7, a gauging point 8, and a guiding portion 9. The outside diameter of the screw portion 7 is substantially equal to the inside diameter of the chamber 3 so that as material to be worked upon is introduced into the hopper 10 and the screw rotated, the latter will move such material through the chamber 3 where the temperature thereof will be suitably modified and then ejected through the orifice 6 in a form determined largely by the relative position between the point 8 and the walls of such orifice.

Point 8 is conical and is substantially complementary to the walls of the die 5 leading to the orifice 6. It will be apparent that for the best operation of the machine and for the reasons previously stated, it becomes necessary to accurately adjust within relatively narrow limits the relative axial positions of the point 8 and the die 5.

In telescopic engagement with the portion 9 of the screw assembly is a sleeve or quill generally indicated at 11. The quill 11 is rotatably supported in the machine by means of anti-friction bearings 12 and 13. There is also provided a collar or radial flange 14 on the quill 11 which cooperates with a fixed bearing 15 on the machine to provide an axial thrust bearing for the screw assembly. The quill 11 is slidably keyed to the guiding portion 9 of the screw and the quill 11 has keyed thereto a driving gear 16 which is in mesh with a driving pinion 17 carried by the transverse shaft 18 on which is mounted a pulley 19. The shaft 18 is driven by means of belts 20 trained about the pulley 19 and the driving pulley 21 which is fixed to a motor shaft 22.

Figures 2, 3:
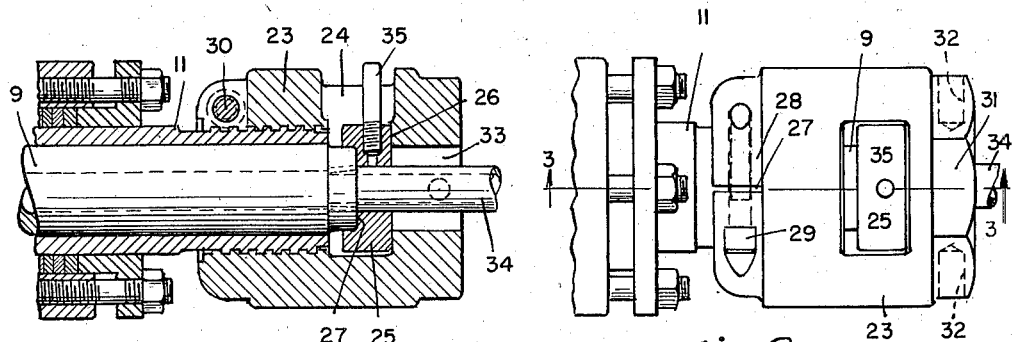
Fig. 2 is a plan view of the right-hand end of the extrusion screw assembly as viewed in Fig. 1 drawn to an enlarged scale.
Fig. 3 is a transverse sectional view of the structure illustrated in Fig. 2 taken on a plane substantially indicated by the line 3—3.

As most clearly illustrated in Figs. 2 and 3, the screw including the forward portion 7, as well as the guiding portion 9, is tubular so as to permit the circulation of a temperature modifying medium therethrough. The rear end of the quill 11 is externally threaded and has threaded thereon a nut 23. The nut 23 is provided with an opening 24 in which is positioned a thrust block 25, the rear face 26 of which bears against the rear wall of the slot 24, and the front face 27 of which is shaped to closely embrace the rear end of the guiding portion 9 of the screw. The nut 23 in the area where it is in threaded engagement with the threaded end of the quill 11 is provided with a saw slot 27, on the opposite sides of which are lugs 28 and 29 for the reception of a screw 30 by which the nut may be clamped onto the threaded end of the quill 11 to prevent relative rotation therebetween after appropriate adjustment has been made.

The rear end of the nut 23 is provided with a polygonal extension 31 for the reception of an adjusting wrench. Opposite faces of the extension 31 are provided with recesses 32 whereby the nut may be engaged by means of a spanner wrench to facilitate rotation of the nut with respect to the quill 11.

Extending through an opening 33 in the end of the nut is a tube 34, the forward end of which is threaded so as to have close fitting engagement with the threaded mouth of the opening into the guiding portion 9 of the screw. The collar 25 is provided with a handle 35 by which the collar 25 may be manipulated during assembly and disassembly of the machine.

When it is desired to adjust the relative axial position of the point 8 with respect to the orifice 6, the nut 23 is adjusted on the end of the quill 11 to such a position as to bring about the desired adjustment of the point 8. It will be observed that these adjustments may be made without requiring a disassembly of any of the remaining portions of the machine.

Other modes of applying the principle of the invention may be employed; change being made as regards the details described, provided the features stated in any of the following claims or the equivalent of such be employed.

I, therefore, particularly point out and distinctly claim as my invention:

1. In an extrusion press, the combination with a machine body provided with a cylindrical chamber terminating in an extrusion orifice, and a bearing fixed with respect to the position of said orifice, of an extrusion screw assembly rotatably supported by said machine body, said assembly comprising a screw provided with a working portion extending into said chamber and a guiding portion having a rear end terminating without said machine body, a driving quill slidably keyed on said guiding portion and likewise having a rear end terminating without said machine body, an axial thrust bearing on said quill adapted to engage said fixed bearing, and means in engagement with the rear ends of said quill and guiding portion of said screw member for adjustably securing said quill and screw member in desired axial relationship, whereby the position of the forward end of the working portion of said screw may be adjusted axially with respect to said orifice.

2. In an extrusion press, the combination with a machine body provided with a cylindrical chamber terminating in an extrusion orifice, and a bearing fixed with with respect to the position of said orifice, of an extrusion screw assembly rotatably supported by said machine body, said assembly comprising a screw provided with a working portion extending into said chamber and a guiding portion having a rear end terminating without said machine body, a driving quill slidably keyed on said guiding portion and likewise having a rear end terminating without said machine body, an axial thrust bearing on said quill adapted to engage said fixed bearing, and means in engagement with the rear ends of said quill and guiding portion of said screw member for adjustably securing said quill and screw member in desired axial relationship, whereby the position of the forward end of the working portion of said screw may be adjusted axially with respect to said orifice, said last-named means comprising a nut having threaded engagement with the rear end of said quill and formed with an inturned flange portion engaging the rear end of the guide portion of said screw member.

3. In an extrusion press, the combination with a machine body provided with a cylindrical chamber terminating in an extrusion orifice, and a bearing fixed with respect to the position of said orifice, of an extrusion screw assembly rotatably supported by said machine body, said assembly comprising a screw provided with a working portion extending into said chamber and a guiding portion having a rear end terminating without said machine body, a driving quill slidably keyed on said guiding portion and likewise having a rear end terminating without said machine body, an axial thrust bearing on said quill adapted to engage said fixed bearing, and means in engagement with the rear ends of said quill and guiding portion of said screw member for adjustably securing said quill and screw member in desired axial relationship, whereby the position of the forward end of the working portion of said screw may be adjusted axially with respect to said orifice, said last-named means comprising a nut having threaded engagement with the rear end of said quill and formed with an inturned flange spaced rearwardly of the rear end of the guide portion of said screw member and a side wall opening leading to the aforesaid space, and a thrust block in said nut inserted through such opening having its opposite ends in engagement with said flange and the rear end of the guiding portion of said screw member.

4. In an extrusion press, the combination with a machine body provided with a cylindrical chamber, and a bearing fixed on said body, of an extrusion screw assembly rotatably supported by said machine body, said assembly comprising a screw provided with a working portion extending into said chamber and a guiding portion, a driving quill slidably keyed on said guiding portion, an axial thrust bearing on said quill adapted to engage said fixed bearing, and means in engagement with the end of said quill and the end of the guiding portion of said screw member for adjustably securing said quill and screw member in desired axial relationship, said last named means comprising a nut threadably secured on said quill and adapted to engage the rear end of the guiding portion of said screw, and said nut provided with means for securing a conduit in predetermined relation to the rear end of said screw member.

5. In an extrusion press, the combination with a machine body provided with a cylindrical chamber terminating in an extrusion orifice, and a bearing fixed with respect to the position of said orifice, of an extrusion screw assembly rotatably supported by said machine body, said assembly comprising a screw provided with a working portion extending into said chamber and a guiding portion, a driving quill slidably keyed on said guiding portion intermediately of its ends, an axial thrust bearing on said quill adapted to engage said fixed bearing, means for driving said quill, and means in engagement with the end of said quill and the end of the guiding portion of said screw member for adjustably securing said quill and screw member in desired axial relationship, whereby the position of the forward end of said screw may be adjusted axially with respect to said orifice, said last named means comprising a nut threadably secured on said quill and adapted to engage the rear end of the guiding portion of said screw, and said nut provided with means for securing a conduit in predetermined relation to the rear end of said screw member.

ALLEN L. HESTON.

REFERENCES CITED

The following references are of record in the file of this patent:

UNITED STATES PATENTS

| Number | Name | Date |
| --- | --- | --- |
| 37,112 | Sault | Dec. 9, 1862 |
| 881,368 | Auchu | Mar. 10, 1908 |
| 917,676 | Spencer | Apr. 6, 1909 |
| 1,833,186 | Stimpson | Nov. 24, 1931 |
| 1,912,374 | Johnson | June 6, 1933 |

FOREIGN PATENTS

| Number | Country | Date |
| --- | --- | --- |
| 2,633 | Great Britain | 1862 |